(12) United States Patent
Boettiger (10) Patent No.: US 8,704,935 B2
(45) Date of Patent: Apr. 22, 2014

(54) IMAGING SYSTEMS WITH ARRAYS OF ALIGNED LENSES

(75) Inventor: Ulrich Boettiger, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 307 days.

(21) Appl. No.: 13/053,728

(22) Filed: Mar. 22, 2011

(65) Prior Publication Data

US 2012/0188421 A1    Jul. 26, 2012

Related U.S. Application Data

(60) Provisional application No. 61/436,123, filed on Jan. 25, 2011.

(51) Int. Cl.
| | |
|---|---|
| H04N 5/225 | (2006.01) |
| H04N 3/14 | (2006.01) |
| H04N 5/335 | (2011.01) |
| H01L 27/00 | (2006.01) |
| H01L 31/062 | (2012.01) |
| H01L 31/113 | (2006.01) |
| H01L 31/0232 | (2014.01) |

(52) U.S. Cl.
USPC ........ 348/340; 348/294; 250/208.1; 257/292; 257/294; 257/432

(58) Field of Classification Search
USPC ........ 348/294, 340; 250/208.1; 257/292, 294, 257/432
See application file for complete search history.

(56) References Cited

U.S. PATENT DOCUMENTS

| | | | |
|---|---|---|---|
| 7,068,432 B2 | 6/2006 | Boettiger et al. | |
| 7,115,853 B2 | 10/2006 | Jiang et al. | |
| 7,199,347 B2 | 4/2007 | Li et al. | |
| 7,205,526 B2 | 4/2007 | Li et al. | |
| 7,218,452 B2 | 5/2007 | Boettiger et al. | |
| 7,365,305 B2 | 4/2008 | Li et al. | |
| 7,405,385 B2 | 7/2008 | Jiang et al. | |
| 7,557,337 B2 | 7/2009 | Jiang et al. | |
| 7,560,295 B2 | 7/2009 | Boettiger et al. | |
| 7,646,551 B2 | 1/2010 | Li et al. | |
| 7,652,821 B2 | 1/2010 | Boettiger et al. | |
| 7,701,636 B2 | 4/2010 | Boettiger et al. | |
| 7,724,439 B2 | 5/2010 | Li et al. | |
| 2005/0133688 A1 | 6/2005 | Li et al. | |
| 2006/0027734 A1 | 2/2006 | Li et al. | |
| 2006/0289723 A1 | 12/2006 | Li et al. | |
| 2007/0096016 A1 | 5/2007 | Li et al. | |
| 2008/0038862 A1* | 2/2008 | Yin et al. | 438/69 |

(Continued)

*Primary Examiner* — Sinh Tran
*Assistant Examiner* — Christopher K Peterson
(74) *Attorney, Agent, or Firm* — Treyz Law Group; David C. Kelllogg (57) ABSTRACT

An imaging system may include an array of lenses, each of which is aligned over a respective one of a plurality of imaging pixels. The array of lenses may be formed in two layers. The first layer may include a first set of non-adjacent lenses and centering structures between the first lenses. The centering structures may be aligned with the first set of lenses as part of a mask design with a high level of accuracy. The second layer may include a second set of lenses, each of which is formed on a respective one of the centering structures. Forming the second set of lenses may include a reflow process in which surface tension forces center the second set of lenses on their respective centering structures, thereby aligning the second set of lenses with the first set of lenses with a high level of accuracy.

9 Claims, 5 Drawing Sheets

(56) References Cited

U.S. PATENT DOCUMENTS

| | | |
|---|---|---|
| 2008/0055729 A1 | 3/2008 | Li et al. |
| 2008/0080056 A1 | 4/2008 | Li et al. |
| 2008/0290383 A1* | 11/2008 | Dunne et al. .................. 257/292 |
| 2009/0034083 A1 | 2/2009 | Li et al. |
| 2010/0073540 A1* | 3/2010 | Wells et al. ................... 348/308 |
| 2010/0123209 A1 | 5/2010 | Duparre et al. |
| 2010/0177408 A1 | 7/2010 | Lake et al. |

* cited by examiner

IMAGING SYSTEMS WITH ARRAYS OF ALIGNED LENSES

This application claims the benefit of provisional patent application No. 61/436,123, filed Jan. 25, 2011, which is hereby incorporated by reference herein in its entirety.

BACKGROUND

This relates generally to integrated circuits, and more particularly, integrated circuits with imager pixels that include gapless microlens arrays.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals.

Modern imagers are sometimes formed with a gap-less microlens array. The gap-less microlens array is used to focus incident light on the pixels of the array of image sensing pixels. Conventional reflowed gap-less microlens arrays are formed in two separate groups. Each group of microlenses is formed in a separate layer (e.g., as part of a separate integrated circuit fabrication step). The first group of microlenses is deposited and formed with reflow processes (e.g., using photolithographic processes, the first group of microlenses are deposited and then melted into their final shape). After the first group of lenses is formed, the second group of microlenses is deposited and formed with similar processes.

In gapless microlens arrays, it is necessary to form the second set of microlenses such that the second set of microlenses approximately vertically overlaps the first set of microlenses. However, during the process of forming the second set of microlens structures, the second set of microlens structures often become misaligned with the first set of microlens structures. Misalignment of the microlens structures may cause undesired effects such as crosstalk between pixels, reduced incident light conversion efficiency, increased noise, and problems with color shading.

It would therefore be desirable to provide gap-less microlens arrays with improved alignment.

DETAILED DESCRIPTION

Figure 1:
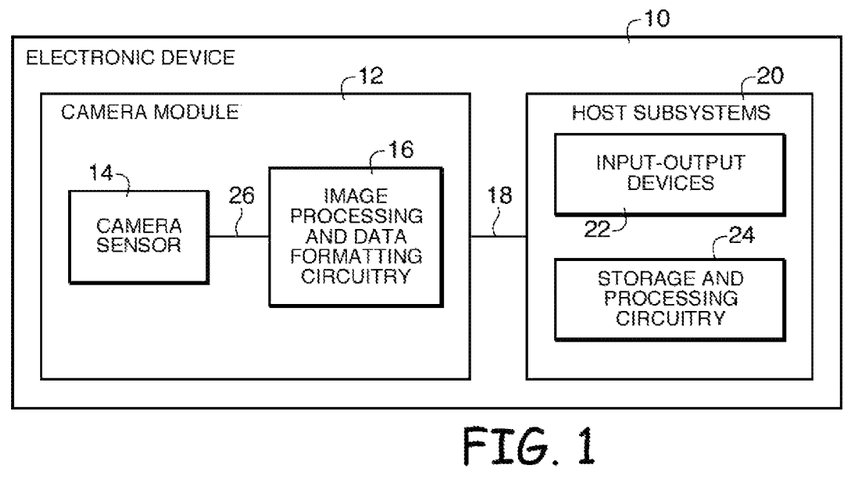
FIG. 1 is a diagram of an illustrative integrated circuit with image sensor circuitry that may include an array of aligned microlenses in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels).

As an example, image sensor 14 may include an aligned lens array such as an aligned gapless microlens array. The lens array may include a number of lenses, each of which focuses incident light on one (or more) pixel(s). The lenses may each be aligned to minimize crosstalk between pixels, to increase incident light conversion efficiency (i.e., the quantum efficiency of imaging array 14), to decrease noise, to improve color shading, etc. (e.g., to reduce undesired effects caused by misalignment of microlenses).

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
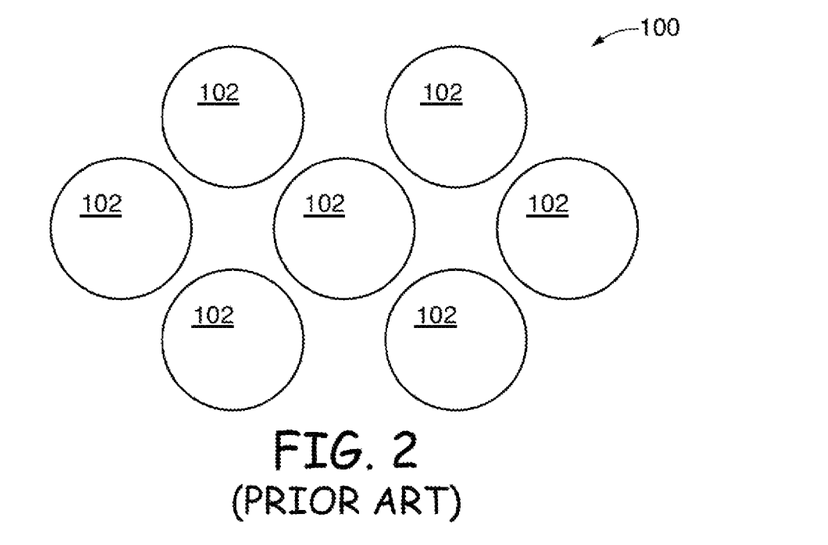
FIG. 2 is a top-view diagram of a first layer of lenses in a conventional microlens array.
Figure 3:
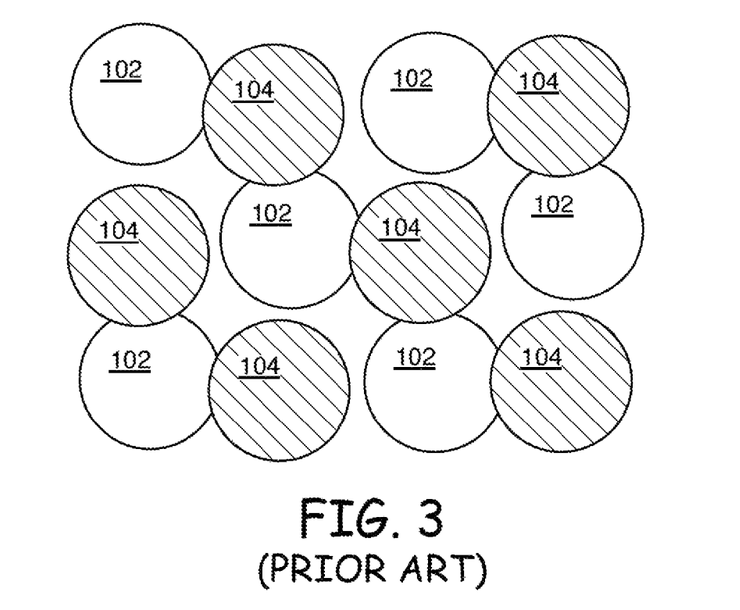
FIG. 3 is a top-view diagram of a second layer of lenses in the conventional microlens array of FIG. 2 showing misalignment between the first and second layers of lenses.
Figure 4:
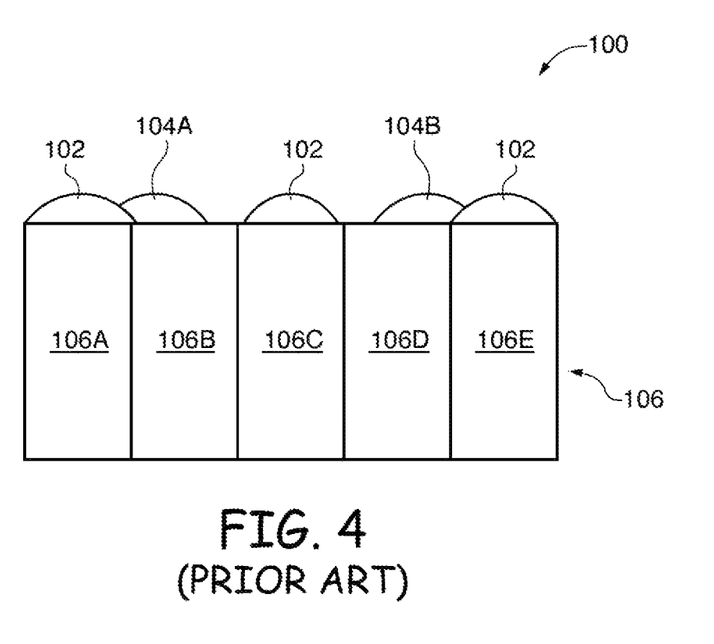
FIG. 4 is a cross-section side view of the misaligned microlens array of FIG. 3 on a conventional array of image sensing pixels.

A conventional gapless microlens array, which suffers from undesirable misalignment of the lenses of the array, is shown in FIGS. 2, 3, and 4.

As shown in FIG. 2, conventional lens array 100 includes a first layer of lenses 102. These first lenses 102 are formed by depositing lens material and reflowing the lens material. Following the formation of the first lenses 102, a second set of lenses 104 are formed, as shown in FIG. 3, by depositing lens material and reflowing the lens material. Because reflow processes are used, adjacent lenses cannot be formed in a single step (e.g., as the adjacent lenses would simply melt together). Instead, adjacent lenses must be formed in two separate sets of processes. In a first set of processes, first lenses are formed (e.g., deposited and reflowed). In a second set of processes, second lenses (e.g., lenses adjacent to the first lenses) are formed. Because the first lenses have already undergone a reflow process when the second lenses are being formed, the first lenses do not undergo reflow when the reflow process is performed for the second lenses (e.g., because the lens material used stabilizes after a single reflow process).

As shown in the top-view of FIG. 3 and the side-view of FIG. 4, the conventional techniques and structures used in forming lenses 102 and 104 are vulnerable to misalignment between the first lenses 102 and the second lenses 104, which leads to undesirable misalignment effects including crosstalk between pixels (e.g., light that should have been guided to a first pixel being inadvertently guided to a second pixel), reduced incident light conversion efficiency (e.g., light that should have been guided to a pixel failing to be guided to any pixel), increased noise, and problems with color shading.

While the lenses 104 shown in the top view of FIG. 3 each have a similar misalignment (e.g., each lens 104 is shifted downward and left of its desired position), in general lenses 104 of conventional lens array 100 are sometimes misaligned differently (e.g., randomly).

As shown in the side view of FIG. 4, the misalignment of lenses 104 can lead to undesirable effects. As an example, incident light passing through misaligned lens 104A may undesirably be guided to pixel 106A (of the array of imaging pixels 106) rather than to pixel 106B (the pixel the incident light would have been guided to if the lenses were not misaligned). Similarly, incident light passing through misaligned lens 104B may undesirably be guided to pixel 106E rather than to pixel 106D. The amount of incident light received by pixels 106B and 106D may be undesirably altered (e.g., reduced) and the amount of incident light received by pixels 106A and 106E may be undesirably altered (e.g., increased). The amount of incident light received by pixel 106C may be undesirably altered (e.g., increased) due to misaligned lenses 104 (not shown) that are adjacent to pixel 106C.

Figure 5:
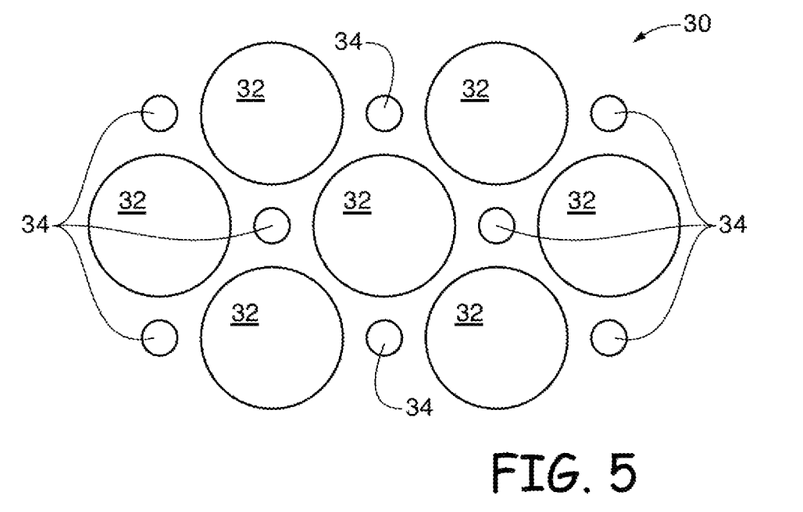
FIG. 5 is a top-view diagram of an illustrative first layer of a microlens array that may include a first set of lenses and a set of centering structures for a second set of lenses in accordance with an embodiment of the present invention.

Image sensor 14 may include an array of aligned lenses. As shown in FIG. 5, an array of aligned lenses such as array 30 may include a first layer having a first set of lenses 32 and a set of centering structures 34.

Figure 7:
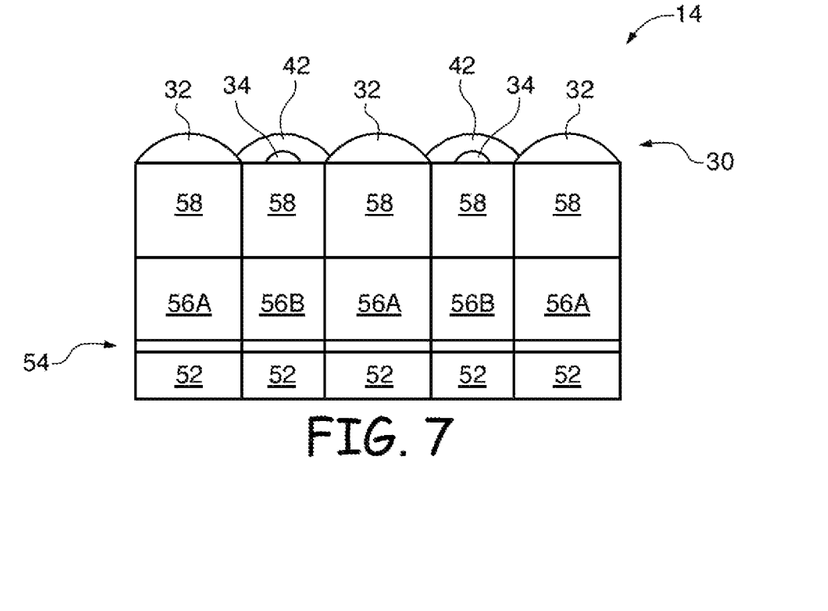
FIG. 7 is a cross-sectional side view of the illustrative first and second layers of the microlens array of FIG. 6 showing that the lenses of the first and second layers may focus incident light onto image sensing pixels in an array of image sensing pixels in accordance with an embodiment of the present invention.

First lenses 32 may be arrayed in a grid pattern over image sensing pixels 52 (shown in FIG. 7). With one suitable arrangement, each lens 32 may be associated with (e.g., located over) a single image sensing pixel 52. With other suitable arrangements, each lens 32 may be associated with two or more image sensing pixels 52.

First lenses 32 may be formed by depositing lens material onto a surface, such as a planarized integrated circuit layer, and then reflowing that lens material. With arrangements of this type, lenses 32 may be convex lenses (e.g., lenses bulging upwards at their center) that are formed above image sensing pixels 52.

The first layer of lens array 30, which is illustrated in FIG. 5, may include centering structures 34. Centering structures 34 may sometimes be referred to herein as alignment features, alignment structures, anchor structures, anchor points, and lenslets.

Centering structures 34 may be formed by depositing material on the same surface that first lenses 32 are deposited onto. With some suitable arrangements, the material that forms centering structures 34 are deposited at substantially the same time as the lens material that forms lenses 32. If desired, one or more common photolithographic masks may be used to simultaneously form lenses 32 and centering structures 34. By utilizing common photolithographic masks and/or by depositing lenses 32 and centering structures 34 simultaneously, lenses 32 may be aligned with centering structures 34 to high levels of accuracy (e.g., lenses 32 and structures 34 may be aligned to levels of accuracy that are not achievable between conventional lenses 102 and lenses 104 using the conventional techniques described in connection with FIGS. 2, 3, and 4). When the material of centering structures 34 is subjected to the reflow process applied to first lenses 32, the material of centering structures 34 may, or may not, also reflow.

Figure 6:
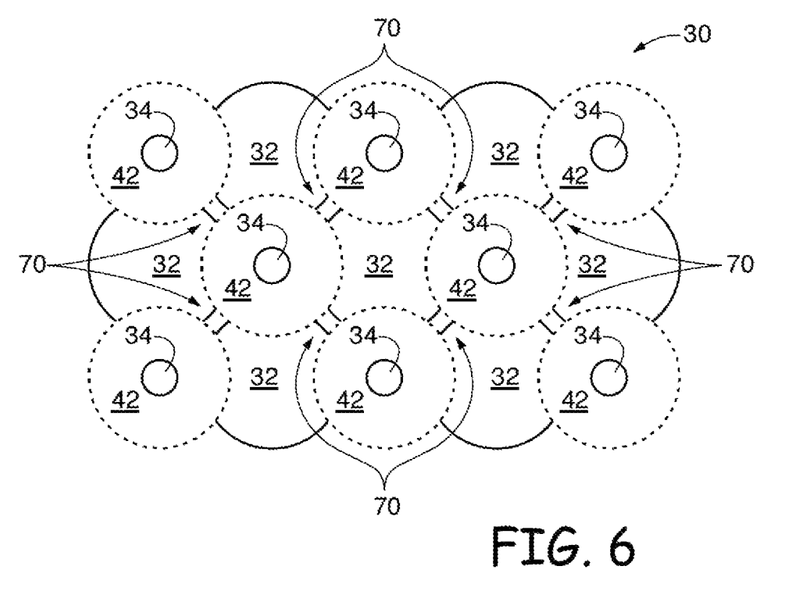
FIG. 6 is a top-view diagram of the illustrative first layer of the microlens array of FIG. 5 and an illustrative second layer of the microlens array in which the second layer of the microlens array may include a second set of lenses that are aligned at least partly using the centering structures of the first layer of the microlens array in accordance with an embodiment of the present invention.

Centering structures 34 may assist in aligning a second set of lenses that are formed between the first lenses 32. Arrangements of this type are shown in FIG. 6. As shown in FIG. 6, aligned lens array 30 may include a second layer having a second set of lenses 42. The centering structures 34 formed in the first layer of array 30 may assist in aligning the second set of lenses 42 with the first set of lenses 32 (e.g., centering the second lenses 42 in the spaces between the first lenses 32).

Second lenses 42 may be arrayed in a grid pattern over image sensing pixels 52 (shown in FIG. 7). With one suitable arrangement, each lens 42 may be associated with (i.e., located over) a single image sensing pixel 52. With other suitable arrangements, each lens 42 may be associated with two or more image sensing pixels 52.

Second lenses 42 may be formed by depositing lens material onto a surface, such as a planarized integrated circuit layer, and then reflowing that lens material. With arrangements of this type, lenses 42 may be convex lenses (e.g., lenses bulging upwards at their center) that are formed above image sensing pixels 52. Depending on the specific set of photolithographic processes used, the second lenses 42 may be formed on the same surface that first lenses 32 are formed on or second lenses 42 may be formed on a different surface (such as a surface above the surface that first lenses 32 are formed on). Because first lenses 32 and centering structures 34 are subject to reflow processes prior to the reflow processes used in forming second lenses 42, first lenses 32 and centering structures 34 may not reflow (e.g., lenses 32 and structures 34 may be stabilized and may remain solid) when subjected to the reflow processes applied to second lenses 42.

When second lenses 42 are formed, centering structures 42 may assist in aligning lenses 42 to lenses 32 and to imaging sensing pixels 52. As an example, lenses 42 may be formed by depositing lens material at or close to the desired location for lenses 42. When the lens material for lenses 42 is subject to a reflow process, the presence of centering structures 42 may draw (e.g., wick, pull, etc.) the melted lens material towards the desired location of lenses 42. This action may result from forces such as surface tension that tend to shift the lens material of each lens 42 such that the alignment structure 42 associated with that lens is centered within the melted material of that lens.

Because the processes used in forming first lenses 32 and centering structures 34 may be more accurate than the processes used in forming second lenses 42 (e.g., because the first lenses are formed in a lower layer), it is possible to more accurately locate centering structures 34 than second lenses 42. However, the presence of centering structures 34, which were accurately placed in the process of forming first lenses 32, can correct misaligned deposits of the lens material used in forming second lenses 42. In particular, even if the lens material deposited to form second lenses 42 is misaligned somewhat, when the lens material is subject to reflow processes, surface tension and the presence of centering structures 34 may tend to center the lens material on the centering structures 34, thereby correcting the initial misalignment.

Centering structures 34 and lenses 42 may be formed from the same material or from different materials. If centering structures 34 and lenses 42 are formed from similar lens materials, each resulting lens (e.g., the lens material of lenses 42 formed over centering structures 34) may be approximately contiguous. If centering structures 34 and lenses 42 are formed from different materials, each resulting lens may have an insert (e.g., a lenslet) that may somewhat alter the optical path through the lens.

With some suitable arrangements, first lenses 32 and second lenses 42 may be gapless lenses (e.g., lenses formed adjacent to each other in such a way as to minimize or eliminate gaps between the lenses). While lenses 32 and 42 may sometimes be referred to herein as gapless lenses and array 30 may sometimes be referred to herein as an gapless lens array 30, in general gapless lenses such as lenses 32 and 42 and gapless lens arrays such as array 30 may sometimes include gaps such as gaps 70. Gaps 70 tend to be in the corners of lenses 32 and 42 (e.g., the positions at which four different lenses converge). Even with the presence of gaps 70, the term gapless may still be applied herein to lenses 32 and 42 and array 30. The term gapless may sometimes be used herein to refer to lenses and arrays of lenses in which gaps are substantially absent between lenses in adjacent columns (e.g., gaps along the left and right sides of lenses are substantially not present) and in which gaps are substantially absent between lenses in adjacent rows (e.g., gaps along the tops and bottoms of lenses are substantially not present).

A cross-sectional side view of image sensor 14 (of FIG. 1) with a microlens array such as microlens array 30 (of FIG. 6) is shown in FIG. 7. As shown in FIG. 7, microlens array 30 may include first lenses 32 and second lenses 42 formed over centering structures 34.

Microlens array 30 may focus and direct incident light onto imaging pixels 52 of image sensor 14. With some suitable arrangements, each microlens (e.g., each of microlenses 32 and 42) may focus and direct incident light onto a single imaging pixel 52 of image sensor 14. With other suitable arrangements, each microlens may focus and direct incident light on multiple imaging pixels 52.

Between microlens array 30 and imaging pixels 52, image sensor 14 may include layers such as layers 54, 56, and 58. Layer 54 may be, as an example, a layer of dielectric. Layer 56 may be, as an example, a color filter layer. With some suitable arrangements, color filter layer 56 may be formed in a Bayer pattern. With arrangements of this type, filters 56A and 56B (when FIG. 7 is showing pixels in a single row or column) may be green and blue filters or may be green and red filters (e.g., filters 56A may be green, while filters 56B are blue or red, or filters 56B may be green, while filters 56A are blue or red). Color filters in layer 56 may sometimes be referred to herein as microfilters (e.g., filters that focus incident light on a single imaging pixel 52). Layer 58 may be a layer of dielectric. With some suitable arrangements, layer 58 may be a planarizing layer.

Figure 8:
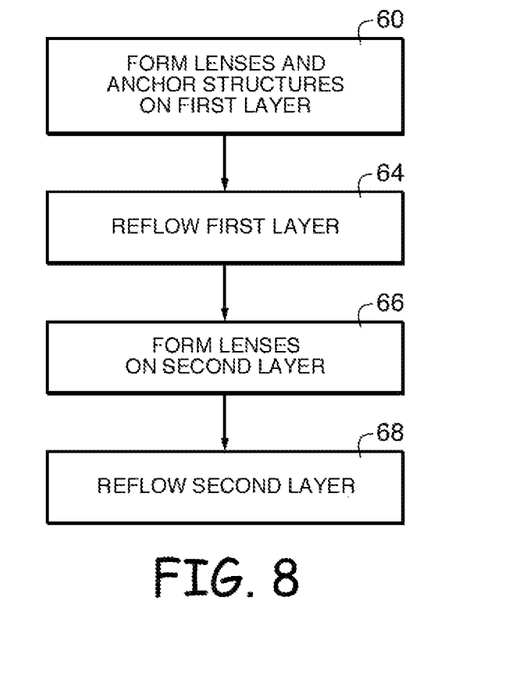
FIG. 8 is a flow chart of illustrative steps involved in forming an array of aligned lenses that includes a first layer that includes a first set of lenses and centering structures and a second layer that includes a second set of lenses that are aligned at least partly using the centering structures of the first layer in accordance with an embodiment of the present invention.

A flow chart of illustrative steps involved in forming an array of aligned lenses such as lens array 30 of FIGS. 6 and 7 is shown in FIG. 8.

In step 60, a first layer of microlenses may be formed. As an example, lens material for a first layer of lenses such as lenses 32 (FIGS. 5, 6, and 7) and material for anchor structures such as centering structures 34 (e.g., for a second layer of lenses such as lenses 42) may be deposited on dielectric layer 58 (FIG. 7). One or more common masks may be used to simultaneously deposit (e.g., form) anchor structures 34 and lenses 32. As an example, a single photolithographic mask may be used to simultaneously deposited anchor structures 34 and lenses 32. With one suitable arrangement, the amount of material deposited centering structures 34 may be less than the amount of lens material deposited for lenses 32.

In step 64, the materials deposited in step 60 may be subjected to a reflow process. During the reflow process, the materials deposited in step 60 may be liquefied (or at least somewhat liquefied) and the materials may reform into approximately their final shapes (e.g., the shapes of lenses 32 and centering structures 34 shown in FIG. 7). If desired, the material for lenses 32 may be deposited and reflowed prior to depositing and reflowing the material for centering structures 42.

In step 66, a second layer of microlenses may be formed. As an example, lens material for a second layer of lenses such as lenses 42 (FIGS. 6 and 7) may be deposited (e.g., on dielectric layer 58, on lenses 32, on centering structures 34, etc.). With one suitable arrangement, the amount of material deposited in step 66 for lenses 42 may be less than the amount of lens material deposited in step 60 for lenses 32 and may be greater than the amount of material deposited in step 60 for centering structures 34.

In step 68, the lens material deposited in step 66 may be subjected to a reflow process. During this reflow process, the lens materials deposited in step 66 may be liquefied (or at least somewhat liquefied) and the lens materials may reform into approximately their final shapes (e.g., the shapes of lenses 42 shown in FIG. 7). As described herein, the presence of centering structures 34 may draw lenses 42 into the desired positions during reflow process 68, even when the lens material for lenses 42 is deposited with misalignment (e.g., when the lens materials for lenses 42 are deposited off-center from the final desired positions). With some suitable arrangements, the material for lenses 32 and centering structures 34 may not liquefy during reflow process 68, as these materials may stabilize after solidifying after the reflow process of step 64.

Various embodiments have been described illustrating aligned lens arrays such as aligned gapless microlens arrays for imaging systems.

An imaging system may include an array of lenses, each of which is aligned over a respective one of a plurality of imaging pixels. The array of lenses may be formed in two layers.

Forming the first layer may include depositing lens material for first lenses and depositing material for centering structures used in aligning second lenses, which are formed following the formation of the first layer. The material for the first lenses and the centering structures may then be subject to reflow processes. Reflowing the lens material for the first lenses may form the first lenses into a lens shape. The first lenses may each be associated with a respective imaging pixel of an array of imaging pixel and the first lenses may be non-adjacent (e.g., each of the first lenses may be over a respective imaging pixel, while none of the other first lenses are formed over the four imaging pixels that are immediately above, below, to the left of, and to the right of that imaging pixel). The centering structures may be formed in between each of the first lenses.

Forming the second layer may include depositing lens material for the second lenses approximately over the centering structures. The lens material for the second lenses may then be subject to reflow processes. Reflowing the lens material for the second lenses may form the second lenses into a lens shape. Because of the presence of the centering structures, surface tension forces (and other forces) may act upon the lens material for the second lenses when the lens material is in a liquid state (during the reflow processes). These forces may draw the lens material for the second lenses such that the lens material for each of the second lenses is approximately centered on the alignment structure associated with that second lens. Because the centering structures are formed approximately simultaneously with the first lenses, the high degree of alignment accuracy with which the centering structures are formed (relative to the first lenses) may be utilized in correcting any initial minor misalignments of the second lenses.

The foregoing is merely illustrative of the principles of this invention which can be practiced in other embodiments.

What is claimed is:

1. An image sensor comprising:
   a first plurality of image sensing pixels;
   centering structures, each of which is located above a respective one of the image sensing pixels of the first plurality of image sensing pixels;
   a first set of lenses, each of which is located above a respective one of the image sensing pixels of the first plurality of image sensing pixels and each of which is associated with a respective one of the centering structures, wherein the first set of lenses is formed by at least partially melting material over the centering structures such that each of the centering structures is incorporated into the lens associated with that alignment structure;
   a second plurality of image sensing pixels, wherein each of the imaging pixels of the first plurality of image sensing pixels is adjacent to four respective imaging pixels of the second plurality of image sensing pixels, wherein each of the imaging pixels of the second plurality of image sensing pixels is adjacent to four respective imaging pixels of the first plurality of image sensing pixels, and wherein the first set of lenses comprises a first set of microlenses, each of which focuses incident light on a single image sensing pixel of the first plurality of image sensing pixels; and
   a second set of microlenses, each of which focuses incident light on a single image sensing pixel of the second plurality of image sensing pixels, wherein the centering structures are formed from first materials that have been deposited onto the image sensor and subjected to a first reflow process, wherein the second set of microlenses are formed from second materials that have been deposited onto the image sensor and subjected to the first reflow process, and wherein the first and second materials are both deposited before the first and second materials are subjected to the first reflow process.

2. The image sensor defined in claim 1 wherein the first set of microlenses are formed from third materials that have been deposited onto the image sensor and subjected to a second reflow process and wherein the third materials are deposited and subjected to the second reflow process after the first and second materials are subjected to the first reflow process.

3. The image sensor defined in claim 2 further comprising:
   a color filter layer, wherein the first and second sets of microlenses are located above the color filter layer and wherein the first and second pluralities of image sensing pixels are located below the color filter layer.

4. The image sensor defined in claim 3 wherein the color filter layer comprises a layer of color filters arranged in a Bayer pattern and wherein each of the color filters is located above a respective one of the image sensing pixels of the first and second pluralities of image sensing pixels.

5. An image sensor comprising:
   first and second pluralities of lenses;
   centering structures, at least some of which are configured to align the lenses of the second plurality of lenses; and
   first and second pluralities of image sensing pixels, wherein each of the lenses in the first plurality of lenses is located above a respective one of the image sensing pixels in the first plurality of image sensing pixels, wherein none of the centering structures are associated with any of the lenses of the first plurality of lenses, wherein each of the lenses in the second plurality of lenses is formed on a respective one of the centering structures and is formed above a respective one of the image sensing pixels in the second plurality of image sensing pixels, wherein the centering structures are formed from first materials that have been deposited onto the image sensor and subjected to a first reflow process, wherein the lenses in the second plurality of lenses are formed from second materials that have been deposited onto the image sensor and subjected to a second reflow process, and wherein the lenses in the first plurality of lenses are formed from third materials that have been deposited onto the image sensor and subjected to the first reflow process.

6. The image sensor defined in claim 5 wherein the first plurality of lenses comprises a first plurality of microlenses, each of which focuses incident light on a single image sensing pixel of the first plurality of image sensing pixels and wherein the second plurality of lenses comprises a second plurality of microlenses, each of which focuses incident light on a single image sensing pixel of the second plurality of image sensing pixels.

7. The image sensor defined in claim 6 further comprising:
   a first plurality of microfilters, each of which filters incident light focused by a respective one of the microlenses of the first plurality of microlenses; and
   a second plurality of microfilters, each of which filters incident light focused by a respective one of the microlenses of the second plurality of microlenses.

8. The image sensor defined in claim 7 wherein each of the microfilters in the second plurality of microfilters comprises a green microfilter that passes green light.

9. The image sensor defined in claim 8 wherein each of the microfilters in a first half of the first plurality of microfilters comprises a red microfilter that passes red light and wherein each of the microfilters in a second half of the first plurality of microfilters comprises a blue microfilter that passes blue light.

* * * * *